United States Patent [19]

Cutburth et al.

[11] Patent Number: 4,703,921
[45] Date of Patent: Nov. 3, 1987

[54] ROTARY SLOT DOG

[75] Inventors: Ronald W. Cutburth, Tracy; David A. Smauley, Livermore, both of Calif.

[73] Assignee: The United States of America as represented by the United States Department of Energy, Washington, D.C.

[21] Appl. No.: 911,025

[22] Filed: Sep. 24, 1986

[51] Int. Cl.[4] .............................................. B23Q 1/08
[52] U.S. Cl. ...................................................... 269/47
[58] Field of Search ....................... 269/91, 93, 47, 49, 269/52, 900; 248/680, 681; 403/408.1, 405.1, 4; 411/539, 537, 531

[56] References Cited

U.S. PATENT DOCUMENTS

| | | | |
|---|---|---|---|
| 3,006,443 | 10/1961 | Siler | 403/408 |
| 3,888,064 | 6/1975 | Basile | 403/408.1 |
| 4,106,876 | 8/1978 | Tregoning | 403/4 |
| 4,191,366 | 3/1980 | Rabin | 269/47 |
| 4,615,128 | 10/1986 | Borsoi | 403/4 |

FOREIGN PATENT DOCUMENTS

| | | | |
|---|---|---|---|
| 6805352 | 10/1969 | Netherlands | 411/531 |
| 568460 | 4/1945 | United Kingdom | 411/531 |

*Primary Examiner*—Robert C. Watson
*Attorney, Agent, or Firm*—P. Martin Simpson, Jr.; L. E. Carnahan; Judson R. Hightower

[57] ABSTRACT

A clamp or dog is disclosed which preferably comprises a slotted stepped cylindrical body which is inserted into a hole in a workpiece and then fastened to a base or fixture using a screw which is inserted through the slot. The stepped configuration provides an annular clamping surface which securely clamps the workpiece against the base or fixture. The slotted cylindrical configuration permits adjustment of the workpiece and retaining clamp in any direction, i.e., over 360°, relative to the mounting position of the screw in the base or fixture.

4 Claims, 9 Drawing Figures

ROTARY SLOT DOG

FIELD OF THE INVENTION

The United States government has rights in this invention pursuant to Contract No. W-7405-ENG-48 between the United States Department of Energy and the University of California for operation under Lawrence Livermore National Laboratory.

BACKGROUND OF THE INVENTION

The present invention relates to clamp-type holders for securing a workpiece to a base or fixture and, in particular, to clamps or dogs for mounting optical beam system components such as beam position sensors.

FIGS. 1 and 2 illustrate a typical edge clamp 10 which is used for mounting a workpiece 11 to a base or fixture 12. Preferably, the base 12 contains a patterned array of tapped attachment holes 13. To secure the workpiece 11 at a selected location on the base 12, one end of the clamp body 14 is positioned over the adjacent outside edge of the workpiece 11 and screw 16 is fastened within hole 13 to tighten the clamp body 14 against the workpiece edge.

The clamp body 14 may be provided with an adjusting screw 17, located at the opposite end of clamp body 14 from the workpiece 11, which is used to maintain the lower surface 18 of the clamp body 14 parallel to the upper edge surface 19 of the workpiece 11. The purpose is to increase the area of contact between the clamp 10 and the workpiece 11 and thereby increase clamping stability. The clamp orientation which results when the adjustment end screw 17 is *not* used is illustrated in phantom by line 21, FIG. 2: the clamp 10 engages the workpiece 11 along a line at or near the edge of the workpiece 11. However, even when adjustment screw 17 is used, contact occurs over a small area. This is the result of the screw 17 acting as a pivot point so that tightening the screw 16 pivots the clamp body 14 about the screw 17 and into point or line contact with the workpiece. In short, the clamping force is not distributed over the interface between the clamp body 14 and the workpiece 11, with the result that the arrangement lacks stability.

Thus, even when adjustment screw 17 is used, obtaining a stable mount for large and/or heavy workpieces may require the use of several, or more, clamps 10 or similar clamps. However, the use of a large number of such peripheral clamps limits the number of available mounting positions, that is, limits adjustment of the workpiece position. Also, because the edge clamps and the workpiece are handled and mounted separately, the process of attaching workpieces to an upright or vertical surface may require several people to handle and position the workpiece and clamps. Furthermore, edge clamps extend outside the workpiece and increase the effective surface area occupied by the workpiece.

SUMMARY OF THE INVENTION

In view of the above discussion, it is an object of the present invention to provide a dog or clamp which quickly fastens a workpiece to a base or fixture with stability.

It is another, related object to provide a dog or clamp which captures the workpiece and is in turn captured by the workpiece.

It is yet another, related object of the present invention to provide such a clamp or dog which is compact and relatively small in size, does not extend outside the periphery of the workpiece, and permits ready adjustment of the position of the workpiece, yet provides secure, stable, wide area contact with the workpiece at any selected position.

In a preferred embodiment, our present invention relates to a clamp comprising a stepped body having an upper body section and a lower body section of smaller cross-section than the upper body section. The lower body section is designed to fit within a hole in a workpiece that is to be mounted to a base. The upper body section forms a flat clamping shoulder at the periphery at the lower body section. A slot extends through the body sections to permit attachment of the clamp and underlying workpiece to the base, typically using a screw. Preferably, the body has a stepped cylindrical configuration to permit adjustment of the mounting position of the clamp and attached workpiece in any orientation, that is, over 360°, relative to the fixed base mounting position of the mounting screw.

Alternatively, other body shapes can be used. For example, an elongated configuration can be used, in particular, in conjunction with an elongated workpiece mounting hole, to permit relatively large-displacement adjustment along a fixed axis.

Additional objects, advantages and novel features of the present invention will be set forth in the description which follows and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 3:
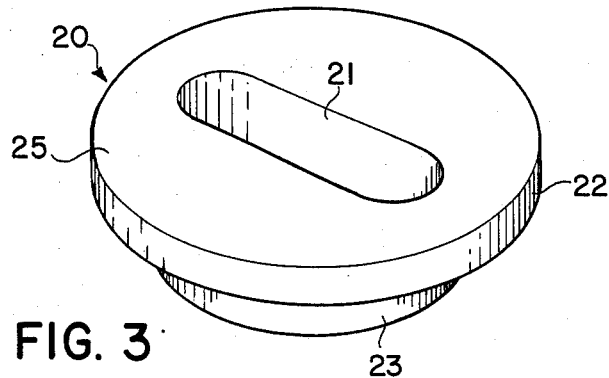
FIG. 3 is a perspective view of the rotary slotted clamp of the present invention.
Figure 4:
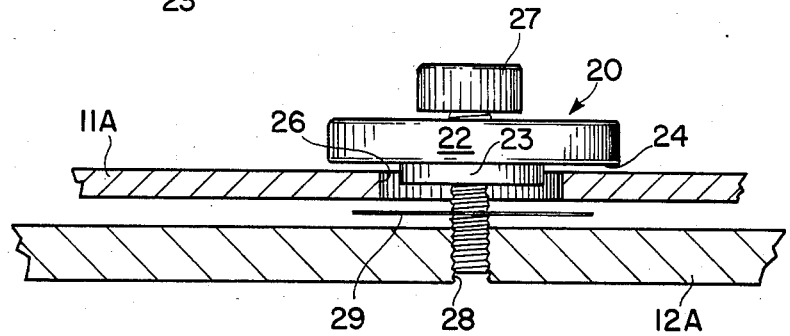
FIG. 4 is a cross-sectional view depicting the use of the rotary slotted clamp of FIG. 3 to mount a workpiece to a base or fixture.

FIG. 3 depicts a perspective view of a rotary slotted clamp 20 which is a presently preferred embodiment of the present invention. Clamp 20 comprises a stepped cylindrical body 25 having a through-slot 21. Typically, the body 25 comprises a first, upper, relatively large cylindrical section 22 and a second, lower, smaller cylindrical section 23 which is co-axial with the first cylinder 22. As shown in FIG. 4, this construction defines a relatively large annular shoulder 24 in the bottom surface of cylinder 22. Of course, the width and surface area of the shoulder 24 are determined by the diameter of the upper cylindrical section 22 and by the difference in the diameters of the two cylindrical sections 22 and 23 of the dog 20.

FIG. 4 illustrates the use of the rotary slotted clamp 20 to mount a workpiece 11A to a base or fixture 12A. For this purpose, one or more holes 26 are provided in the workpiece 11A and one or more holes 28 are provided in the base 12A for receiving clamp attachment screw or bolt 27. In addition, a flat retainer or clip 29 (which may be of the type used to hold screws in electrical switches and outlets) can be used to retain the clamp 20 within the mating workpiece hole 26. Without the retainer 29, the process of mounting workpiece 11A to the fixture 12A involves simply aligning the workpiece hole 26 and clamp slot 21 with fixture hole 28, then securing the clamp 20 and workpiece 11A to the fixture by advancing retaining screw 27 into the hole 28. The use of the retainer or clip 29, of course, further simplifies the process by eliminating the need to handle the clamp 20 and workpiece 11A separately and to insert the clamp 20 into the workpiece retainer hole 26. In short, with or without retainer 29, the clamp 20 captures the part 11A and the part 11A in turn captures the clamp 20. This double capture facilitates the handling and positioning of the workpieces and the clamp and thus facilitates mounting workpieces, particularly in upright or vertical mounting orientations.

Figure 1:
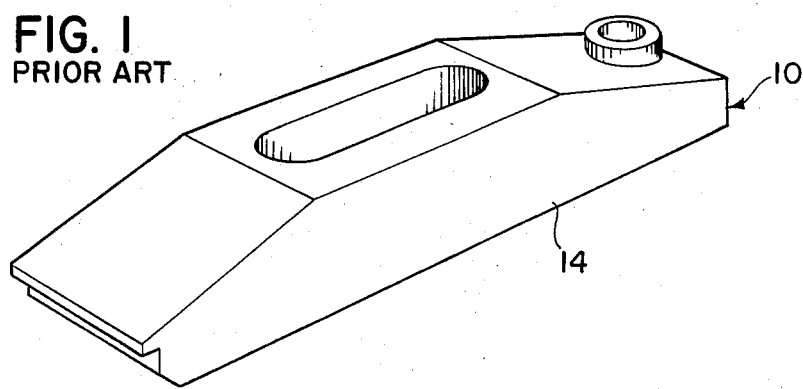
FIG. 1 is a perspective view of a prior art end clamp.
Figure 2:
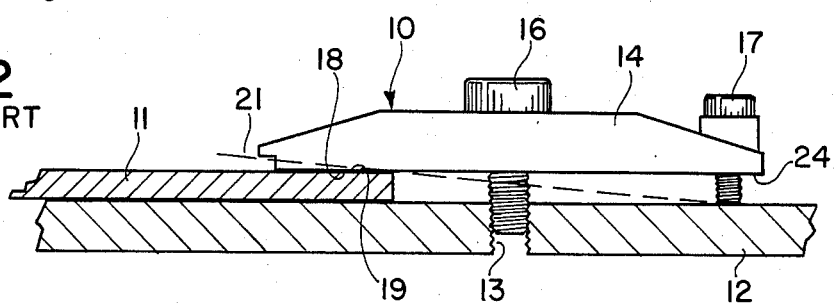
FIG. 2 is a cross-sectional view indicating the use of the clamp of FIG. 1 to mount a workpiece against a base or fixture.

In addition, the clamp 20 is mounted within the body of the workpiece 11A, not at the edge of or outside of the workpiece 11A and, thus, requires a lesser surface mounting area than does the end clamp arrangement illustrated in FIG. 2.

Furthermore, the construction and configuration of the clamp 20 permit adjustment of the position of the workpiece 11A in any direction (over 360°) relative to each fixed base position 28 and provide a relatively large, stable surface area contact with the workpiece which is independent of orientation and position.

Figure 5:
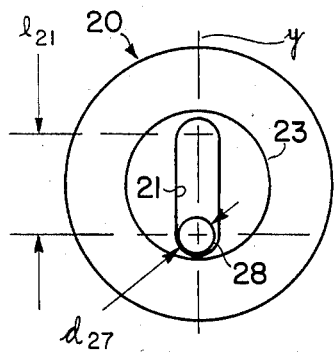
FIGS. 5-7 illustrate the essentially unlimited orientation and position adjustment of the rotary slotted clamp of FIG. 3 relative to a fixed base position.
Figure 6:
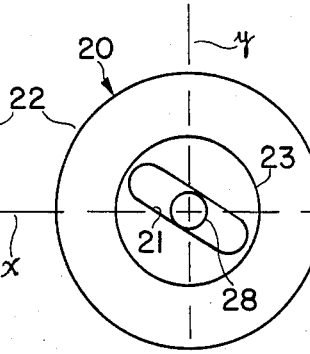
Figure 7:
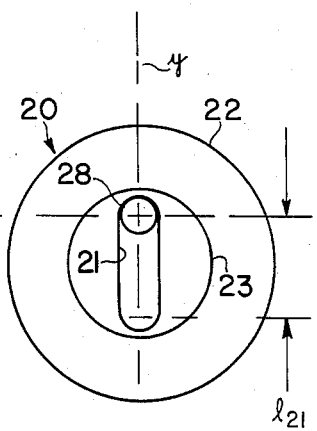

This orientation-independent mounting is illustrated in FIGS. 5–7 for a fixed mounting hole position 28. Basically, the workpiece 11A can be moved along elongated slot 21 in any direction by simply orienting the length of the slot 21 in the desired direction and moving the clamp 20 and workpiece 11A along the slot 21 in that direction. (This is true even when a number of clamps 20—20 are used in the manner illustrated in FIG. 9 to mount a workpiece such as 11A to a fixture or base such as 12A.) As an example, in FIG. 5 the clamp 20 is positioned with the slot 21 oriented vertically upwardly. The clamp 20 with the associated workpiece 11A, not shown, is displaced vertically along the slot 21 the length of the slot, $l_{21}$. In FIG. 6, the clamp 20 is centered on the slot 21. FIG. 7 depicts the opposite positioning extreme relative to FIG. 5. That is, the clamp 20 is displaced vertically downward along the slot the distance $l_{21}$.

When both the clamp 20 and the mounting hole 26 are circular in transverse cross-section, the total possible workpiece position adjustment, $d_{max}$, along any direction relative to a fixed mounting hole position 28 is approximately equal to the length of the slot plus the gap between the attachment hole 26 and clamp body section 23. Thus, $d_{max} \simeq l_{21} + (d_{26} - d_{23})$, where $l_{21}$ is the length of the slot (see FIG. 5), $d_{26}$ is the diameter of mounting hole 26 (FIG. 8) and $d_{23}$ is the diameter of the body section 23 (FIG. 8).

Figure 8:
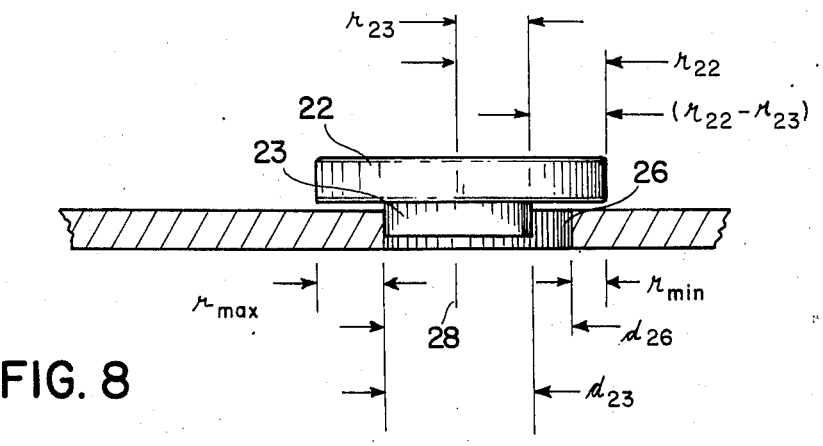
FIG. 8 depicts the minimum and maximum annular clamping contact between the clamp of FIG. 3 and a workpiece.

Referring to FIG. 8, regardless of its orientation and position within the mounting hole 26, clamp 20 engages workpiece 11A over a relatively large, generally annular surface area having a minimum diameter $r_{min} = r_{22} - r_{23} - (d_{26} - d_{23}) = r_{22} + r_{23} - d_{26}$, where $r_{22}$ and $r_{23}$ are the radii of cylinder sections 22 and 23. The maximum diameter is $r_{max} = r_{22} - r_{23}$. As a consequence, the dog 20 engages and clamps the workpiece 11A over a large annular area, thereby providing distributed stable clamping. In addition, by providing an x,y grid of mounting holes which are spaced apart twice the adjustment distance $l_{21} + (d_{26} - d_{23})$ in both the x and y directions, the rotary slot dog can be used to position a workpiece at any desired position within the grid (including but not limited to the mounting hole positions).

Figure 9:
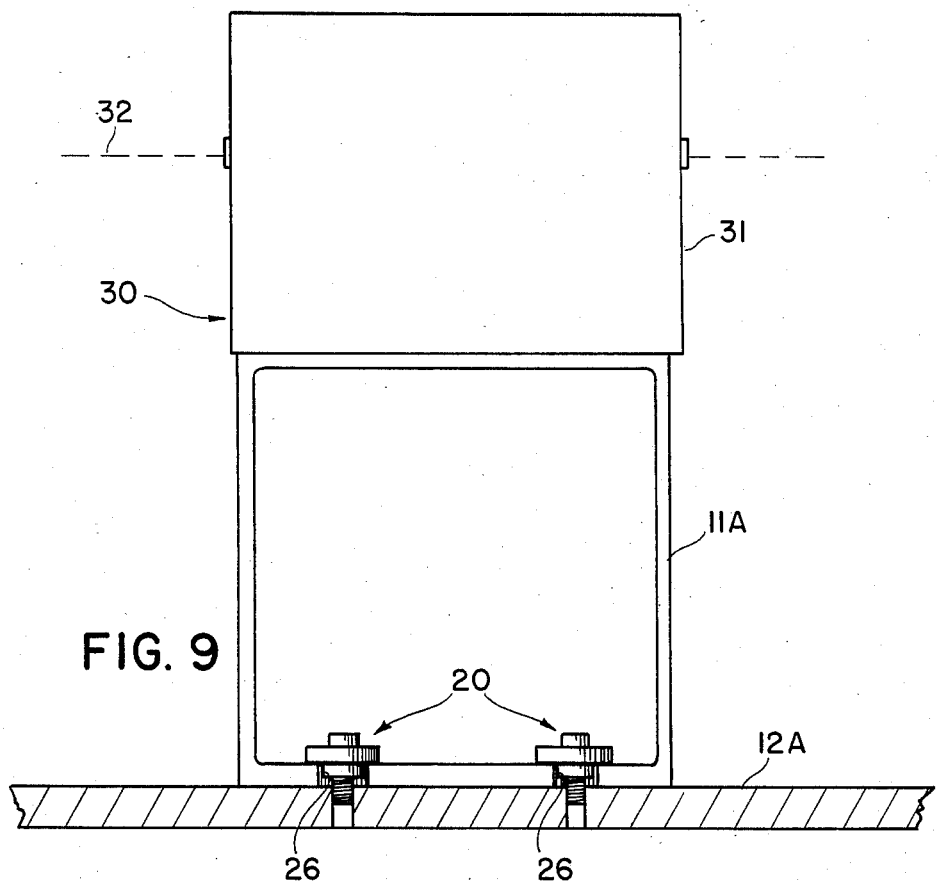
FIG. 9 depicts the use of rotary slotted clamps of the present invention to mount an in-line optical sensor.

FIG. 9 illustrates one example of the use of the clamp 20, to mount an in-line optical beam sensor unit 30 to a base or wall 12A. The sensor 30 includes a solid-state sensor section 31 which is positioned in line with a laser beam 32. The sensor apparatus 31 is well known within the laser technology. In any event, sensor 31 does not comprise any part of the present application and need not be described in detail here. The illustrated unit 30 also comprises a base 11A having mounting holes 26 formed therein for receiving clamps 20—20 for the purpose of clamping the workpiece base 11A and associated sensor unit 31 to the wall or fixture 12A.

The foregoing description of the preferred embodiment of the invention has been presented for purposes of illustration and description. It is not intended to be exhaustive or to limit the invention to the precise form disclosed and many modifications and variations are possible in light of the above teaching. For example, other configurations of the clamp 20 and slot 21 and of the mounting hole 26 are possible. For example, the workpiece mounting hole 26 can be an elongated slot and, if desired, the clamp and mating body section 23 can be formed congruent with the slot 26 to provide relatively very long controlled adjustment displacement of the clamp and the workpiece along the slot. As another alternative, the workpiece slot can be an x-shape to provide precise adjustment along two, typically orthogonal axes. However, because of its orientation independence and stable clamping characteristics, the circular/cylindrical clamp 20 shown in FIG. 3 is the presently preferred embodiment. The preferred embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined only by the claims appended hereto.

What is claimed is:

1. An assembly comprising:

(a) a stepped body comprising (1) an upper body section, (2) a lower body section of smaller cross-section than the upper body section, the upper body section forming a flat clamping shoulder at the periphery of the lower body section, and (3) a slot extending through the body sections;

(b) a workpiece having a mounting hole therein receiving the lower body section and also having a surrounding flat surface adjacent the shoulder, the lateral dimension of the mounting hole being larger than the lateral dimension of the lower body section, thereby providing a gap between the lower body section and the hole equal to the difference in said dimensions;

(c) a base;

(d) fastening means extending through the slot fastening the stepped body to the base and thereby clamping the workpiece between the shoulder and the base; and (e) the lateral dimension of the upper body section exceeding the lateral dimension of the lower body section by an amount at least equal to said gap such that the workpiece is adjustable a distance transverse to said workpiece mounting hole equal to the combined length of the gap and the slot.

2. The assembly of claim 1 wherein the joined body sections are generally cylindrical, forming a stepped cylindrical body, the workpiece being adjustable in any direction, over 360°, relative to the workpiece mounting hole.

3. The assembly of claim 1, each body having an elongated transverse cross-section, generally parallel to the length of the slot.

4. Components for mounting a workpiece to a base comprising:

(a) fastening means;

(b) a stepped generally cylindrical body having an upper cylindrical body section, a lower body section of smaller diameter than the upper body section, the upper body section forming a generally flat annular clamping shoulder at the periphery of the lower body section, and an elongated slot extending through the body sections for receiving said fastening means;

(c) a workpiece having a flat section and having a mounting hole therein of diameter larger than the lower body section for receiving the lower body section and of diameter smaller than the upper body section, thereby providing a gap between the lower body section and the hole equal to the difference in said diameters;

(d) a base;

(e) said fastening means including means for extending through the slot to fasten the stepped body to the base for clamping the workpiece between the annular shoulder and the base; and (f) the diameter of the upper body section exceeding the diameter of the lower body section by an amount at least equal to said gap, whereby the workpiece is adjustable over a distance transverse to the workpiece mounting hole equal to the combined length of the gap and the slot.

* * * * *